United States Patent
Nitsche

(10) Patent No.: US 8,886,143 B2
(45) Date of Patent: Nov. 11, 2014

(54) RF TRANSCEIVER AND MODEM COMPRISING SUCH A TRANSCEIVER

(75) Inventor: Gunnar Nitsche, Radebeul (DE)

(73) Assignee: Intel Mobile Communications GmbH, Neubiberg (DE)

( * ) Notice: Subject to any disclaimer, the term of this patent is extended or adjusted under 35 U.S.C. 154(b) by 543 days.

(21) Appl. No.: 13/018,465

(22) Filed: Feb. 1, 2011

(65) Prior Publication Data

US 2011/0195675 A1    Aug. 11, 2011

(30) Foreign Application Priority Data

Feb. 5, 2010  (EP) ..................................... 10152786
Mar. 26, 2010  (EP) ..................................... 10157906

(51) Int. Cl.
*H04B 1/18*    (2006.01)
*H04B 1/40*    (2006.01)

(52) U.S. Cl.
CPC ...................................... *H04B 1/40* (2013.01)
USPC ................... 455/180.3; 455/183.1; 455/183.2

(58) Field of Classification Search
USPC .............. 455/90.2, 76, 77, 78, 131, 132, 133, 455/141, 180.3, 183.1, 183.2
See application file for complete search history.

(56) References Cited

U.S. PATENT DOCUMENTS

| | | | |
|---|---|---|---|
| 7,498,888 B2 | 3/2009 | Nitsche et al. | |
| 7,764,934 B2* | 7/2010 | Jensen | ........................... 455/91 |
| 2006/0264195 A1* | 11/2006 | Boos | ............................. 455/317 |
| 2007/0142080 A1* | 6/2007 | Tanaka et al. | .............. 455/552.1 |
| 2009/0135781 A1* | 5/2009 | Vaisanen et al. | .............. 370/330 |
| 2010/0273442 A1* | 10/2010 | Zeng et al. | .................... 455/208 |

FOREIGN PATENT DOCUMENTS

WO    2005062471 A1    7/2005

* cited by examiner

*Primary Examiner* — Ping Hsieh
(74) *Attorney, Agent, or Firm* — Schwegman Lundberg & Woessner, P.A.

(57) ABSTRACT

A LTE compliant RF transceiver includes at least one transmit path and at least two receive paths. A switching arrangement connected between a transmit PLL synthesizer and at least one transmit path as well as between a receive PLL synthesizer and at least two receive paths allows the transmit PLL synthesizer to selectively be connected to the receive side of the transceiver as well as the receive PLL synthesizer to selectively be connected to the transmit side of the transceiver, thereby considerably increasing flexibility of the RF transceiver which enables both speed-up of handover procedures and power savings. A modem including the transceiver is also provided.

5 Claims, 7 Drawing Sheets

RF TRANSCEIVER AND MODEM COMPRISING SUCH A TRANSCEIVER

CROSS REFERENCE TO RELATED APPLICATIONS

This application claims priority of European Patent Application No. 10152786.9 filed on Feb. 5, 2010 and European Patent Application No. 10157906.8 filed on Mar. 26, 2010, the entire disclosure of these applications being hereby incorporated herein by reference.

BACKGROUND ART

The present invention relates to an LTE compliant RF transceiver. The invention also relates to a modem device comprising such a transceiver.

RF transceivers are known to be a salient component of modem devices in wireless telecommunications devices to provide communication in both directions, i.e. the ability to send and receive at the same time. With the frequency-division duplexing (FDD) transmission technique, transmitter and receiver operate at different carrier frequencies, i.e. uplink (from terminal to base station) and downlink (from base station to terminal) sub-bands are separated by a frequency offset which enables a station to send and receive at the same time. In contrast, time-division duplexing (TDD) is the application of time-division multiplexing to separate transmit and receive signals. It uses the same frequency for uplink and downlink.

3GPP LTE (3rd Generation Partnership Project Long Term Evolution) which is the upcoming standard of 4th generation radio access networks employs both FDD and TDD, and also employs Orthogonal Frequency Division Multiplexing (OFDM) as a downlink modulation scheme. Multiple transmit antennas at the base station side and the mandatory requirement of multiple receive antennas at the mobile terminal side, i.e. user equipment, permit simultaneous transmission of multiple data streams, or data layers, from one base station to one mobile terminal. This transmission method is known as Multiple-Input Multiple-Output (MIMO) OFDM.

Many modern wireless communication systems use both Frequency-Division Duplexing (FDD) and Multiple Input Multiple Output (MIMO). Also, TDD/FDD dual mode devices are known.

According to the LTE standard, the minimum requirements for antennas of a communications terminal is two receive antennas and one transmit antenna, i.e. a typical implementation of an LTE terminal provides a single transmit path and a pair of receive paths. Since in FDD transmit and receive operate at different frequencies, as stated above, two independent PLLs (Phase Locked Loops) are required in the RF transceiver of such a terminal.

FIG. 1 shows a typical known RF transceiver as comprising one transmit (Tx) path and two receive (Rx) paths. Both the Tx side and the Rx side each have a dedicated PLL synthesizer associated therewith for setting the carrier frequency for the respective path. Each path comprises a mixer to receive said carrier frequency from the PLL and use it to convert a respective RF signal into a BB signal or vice versa, and a filter for adapting the signal to the desired bandwidth. In particular, as shown in FIG. 1, a Tx path comprises Tx filter 112 and Tx mixer 114, a first Rx path comprises Rx filter 152 and Rx mixer 154, and a second Rx path comprises Rx filter 162 and Rx mixer 164.

Tx mixer 114 receives a baseband signal (Tx BB in) which has been adjusted in bandwidth by Tx filter 112, and receives a carrier frequency from dedicated Tx PLL 130 to convert the filtered baseband signal up to RF for output (Tx RF out) to a Tx antenna for transmission.

Each Rx mixer receives an RF signal input, Rx RF in 1 and Rx RF in 2, from a separate Rx antenna, and a carrier frequency from a shared Rx PLL synthesizer 140 to downconvert the received RF signal to a baseband signal for supply, via a respective RF filter (152, 162) which adjusts the bandwidth of the signal, to a baseband unit for demodulation.

PLL synthesizers such as Tx PLL 130 and Rx PLL 140 generally comprise a control loop which includes a voltage controlled oscillator (VCO), a reference clock generator, a phase detector charge pump and a loop filter. For more details about the internal structure of a typical PLL used in RF communication devices see e.g. U.S. Pat. No. 7,498,888 (WO2005062471 "Method and arrangement for interference compensation in a voltage-controlled frequency generator").

There is a continuing demand in mobile communications for increased data rates, speed-up of communication setup and/or communication handling, and power savings.

A general object of the invention is to make the PLL configuration flexible, so that the RF transceiver can support more functionality. A further object of the invention is to provide an improved LTE compliant RF transceiver and an improved LTE compliant modem which allow to speed-up handover procedures in mobile communication.

BRIEF SUMMARY OF THE INVENTION

According to the invention there is provided an RF transceiver for an LTE compliant communication device that comprises a transmit side with a transmit PLL synthesizer, and a receive side with a receive PLL synthesizer. The transmit side further comprises at least one transmit path including a mixer unit and a filter unit, and the receive side comprises at least two receive paths, each path including a respective mixer unit and filter unit. The transmit PLL synthesizer is operative to provide a carrier frequency for the at least one transmit path, and the receive PLL synthesizer is operative to provide a carrier frequency for said at least two receive paths. The inventive RF transceiver is characterized in that the transmit PLL synthesizer is connected to the transmit side, in particular to the mixer unit, via a switching arrangement and the receive PLL synthesizer is connected to the receive side, in particular to at least one of the receive mixer units, via the same switching arrangement, wherein this switching arrangement is operable to selectively connect said transmit PLL synthesizer to said at least one receive mixer unit and to selectively connect said receive PLL synthesizer to said transmit mixer unit.

According to a preferred embodiment, the transmit PLL synthesizer is connected to the transmit mixer unit via a first pole of a first two-pole switch, and the receive PLL synthesizer is connected to one of said receive mixer units via a second pole of a second two-pole switch, wherein the first poles of the first and second two-pole switches being interconnected and the second poles of the first and second two-pole switches being interconnected such that the first switch is operable to selectively connect the receive PLL synthesizer to said transmit mixer unit and the second switch is operable to selectively connect the transmit PLL synthesizer to said one of receive mixer units. Thus, by simply adding a few switches which imply only little implementation overhead the flexibility of RF transceivers is significantly enhanced.

According to another embodiment a third switch can be connected between the Rx PLL synthesizer and the other one of the pair of receive paths in a way similar to that of the second switch to further enhance flexibility of the RF transceiver.

According to a second aspect the invention provides a modem for an LTE compliant communication device, substantially comprising a baseband unit and an RF transceiver as described above. The baseband unit comprises a baseband transmitter, a baseband receiver, a baseband controller, said baseband controller providing control signals for the switching arrangement of the transceiver unit.

According to a further preferred embodiment, the modem may further comprise a received signal strength indication measurement unit, in which case each of the first and second receive paths of the transceiver is connected to a first and second switch of said baseband unit, each switch being selectively connectable to the baseband receiver or to the baseband RS SI unit, and the switches of both the baseband unit the transceiver unit can be controlled by the baseband controller.

In this way, the invention advantageously provides a flexible PLL configuration which allows the RF transceiver to support more functionality at very little implementation overhead by enabling use of the transceiver PLLs, and in particular use of the pair of Rx paths for other purposes than that to which they were basically intended, namely spatial diversity (MIMO) compliant to the LTE standard.

BRIEF DESCRIPTION OF DRAWING FIGURES

Additional features and advantages of the present invention will be apparent from the following detailed description of specific embodiments which is given by way of example only and in which reference will be made to the accompanying drawings, wherein.

DETAILED DESCRIPTION

Figure 2:
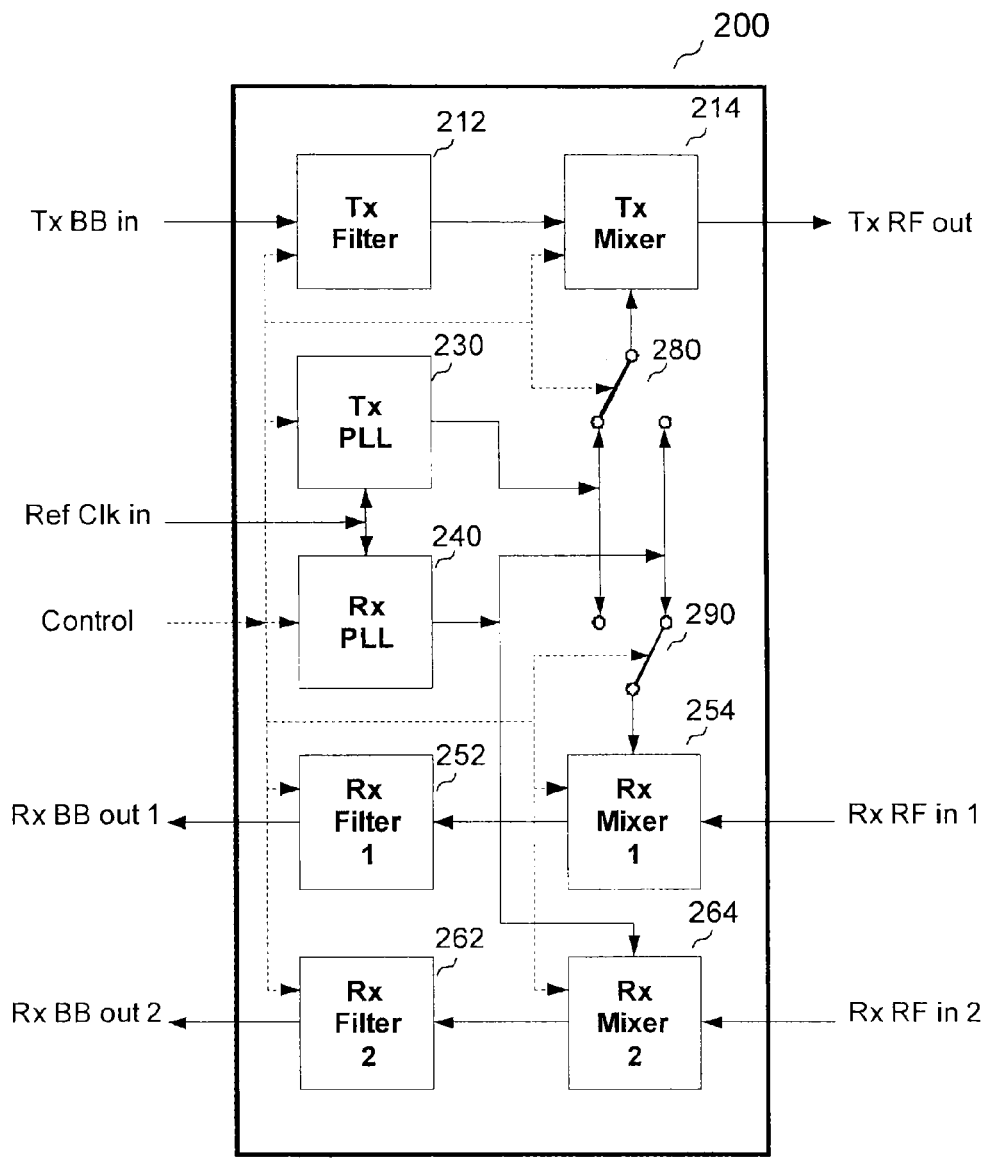
FIG. 2 shows a schematic block diagram of a first embodiment of an RF transceiver according to the invention in an ordinary LTE operation mode.

FIG. 2 shows a schematic block diagram of an RF transceiver 200 according to the invention that can be used in an LTE communication device. RF transceiver 200 comprises an Rx side including two receive paths, Rx1 and Rx2, and a Tx side including a single Tx path. Each of Rx and Tx paths comprise a mixer and a filter. Each of Rx mixers 154, 164 receives an RF signal from a separate Rx antenna and can receive a carrier frequency from a shared Rx PLL synthesizer 240 to downconvert the received RF signal into a baseband signal for supply to RF filter 252, 262, respectively, which adjusts the bandwidth of the signal which is then supplied to a baseband unit for demodulation. A Tx mixer 214 receives a baseband signal which has been adjusted in bandwidth by a Tx filter 212, and can receive a carrier frequency from an associated Tx PLL 230 to convert the filtered baseband signal up to RF for output to a Tx antenna for transmission. PLL synthesizers 230, 240 receive a common reference clock signal, Ref clk in, from a clock generator, which is either a separate device or integrated in the RF transceiver or BB unit.

Figure 1:
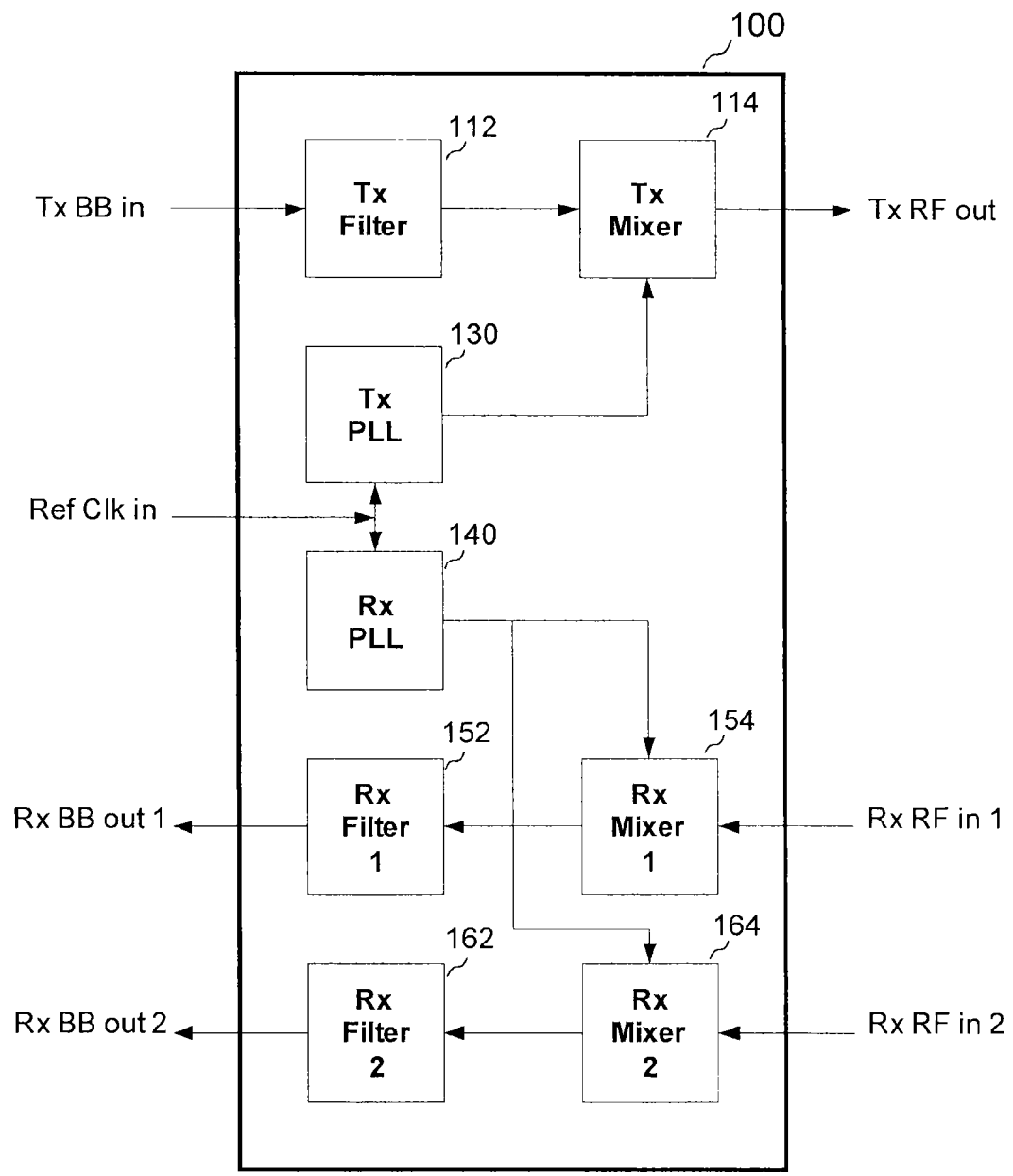
FIG. 1 shows a schematic block diagram of a prior art RF transceiver of a wireless communication device.

To the extend described so far, RF transceiver 200 is similar to RF transceiver 100 of FIG. 1. In contrast to RF transceiver 100, Tx PLL 230 and Rx PLL 240 are not directly connected to the respective mixer. Rather, Tx PLL 230 is connected to Tx mixer 214 through a two-way switch 280 the second pole thereof being connected to Rx PLL 240, and Rx PLL 240 is connected to Rx mixer 254 through a two-way switch 290 the second pole thereof being connected to Tx PLL 230.

With switches 280, 290 the flexibility for employing the transceiver PLLs is considerably enhanced in comparison to a known transceiver.

FIG. 2 shows the ordinary operation mode of Rx transceiver 200, which is the same as provided by hard-wired prior art transceiver illustrated in FIG. 1. In particular, Tx mixer switch 280 is switched to connect Tx PLL 230 to Tx mixer 214, and Rx mixer switch 290 is switched to connect Rx PLL 240 to Rx mixer 254 such that both Rx mixers, 254 and 264, use Rx PLL 240, with Rx mixer 264 being fixedly connected to Rx PLL 240.

Switches 280, 290 enable RF transceiver 200 to be operated in alternative operation modes which, under certain preconditions, allow to speed-up communication handover and/or power savings. For example, if the terminal is connected to an FDD network and currently is receiving on one Rx path but not transmitting, the Tx PLL is free and can be switched to the second Rx path, allowing to simultaneously perform measurements on different frequencies while staying on the serving cell using the first Rx path. This may significantly increase the speed of handovers. In another example, the terminal can be connected to a TDD (Time-Domain Duplex) network which means that Rx and Tx operate on the same frequency. With the inventive arrangement the Rx PLL can be switched to both Rx and Tx paths such that the Tx PLL becomes free. The Tx PLL can then either be switched off to save power, or it can be used to perform measurements on different frequencies when the second Rx path is not required for normal operation. This is particularly useful for FDD/TDD dual-mode RF transceivers.

Three different alternative operation modes of RF transceiver 200 will now be explained in detail with reference to FIGS. 3 to 5.

Figure 3:
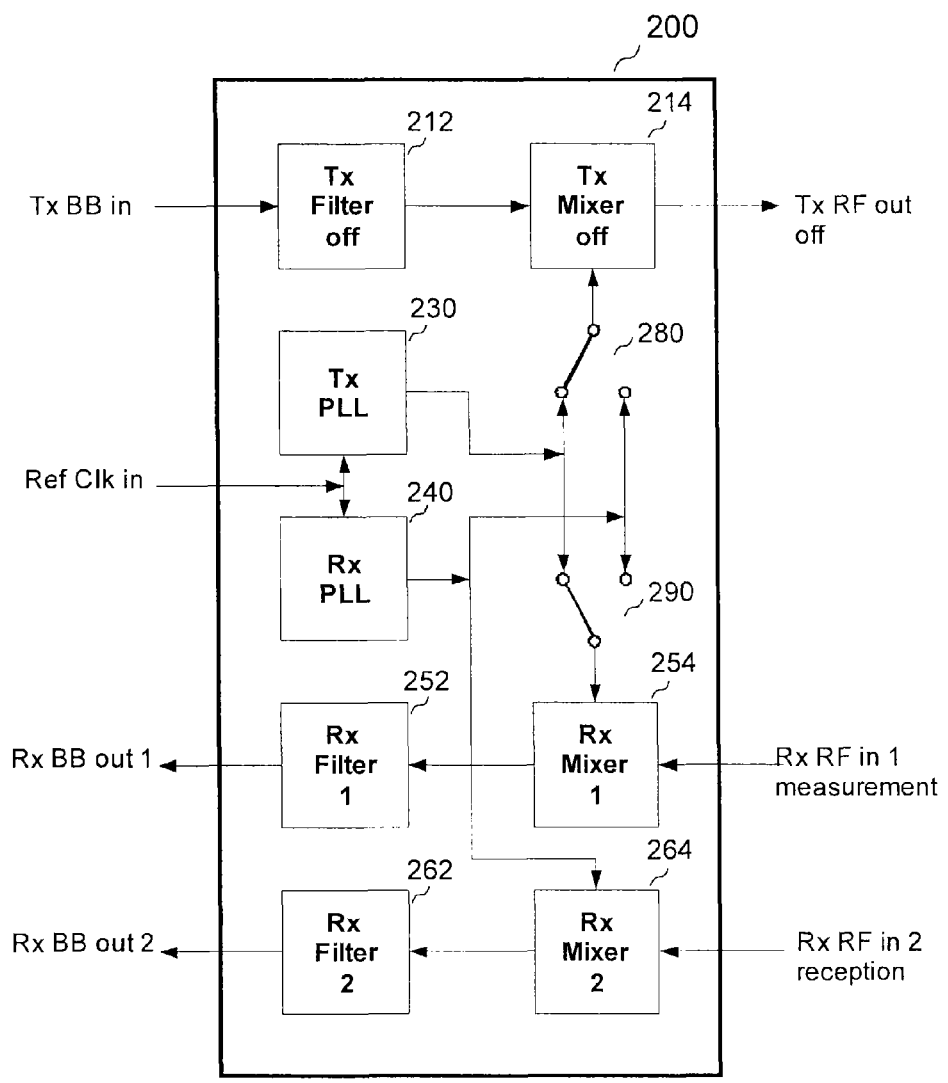
FIG. 3 shows the RF transceiver of FIG. 2 in a first alternative operation mode.

In FIG. 3, the terminal does currently not transmit, so Tx side is off, as indicated at 212, 214. The second receive path, Rx 2, is used for reception. In this case, the first Rx mixer, 254, can temporarily be switched to Tx PLL 230, which then is configured to a Rx frequency different from the current receive frequency, allowing to perform measurements at that different frequency to look for an alternative carrier frequency exhibiting a better signal-to-noise ratio (SNR) for optionally switching over to another communication cell.

Figure 4:
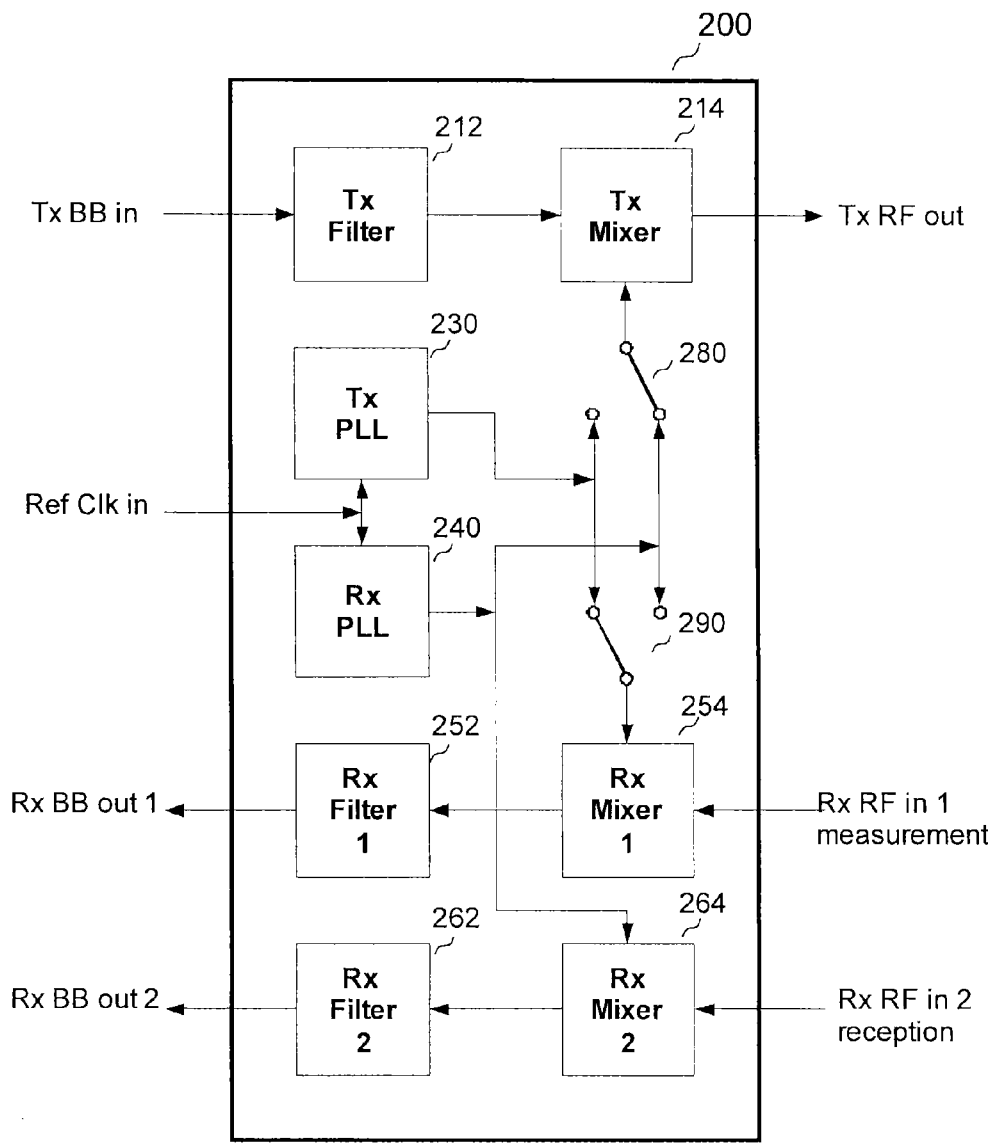
FIG. 4 shows the RF transceiver of FIG. 2 in a second alternative operation mode.
Figure 5:
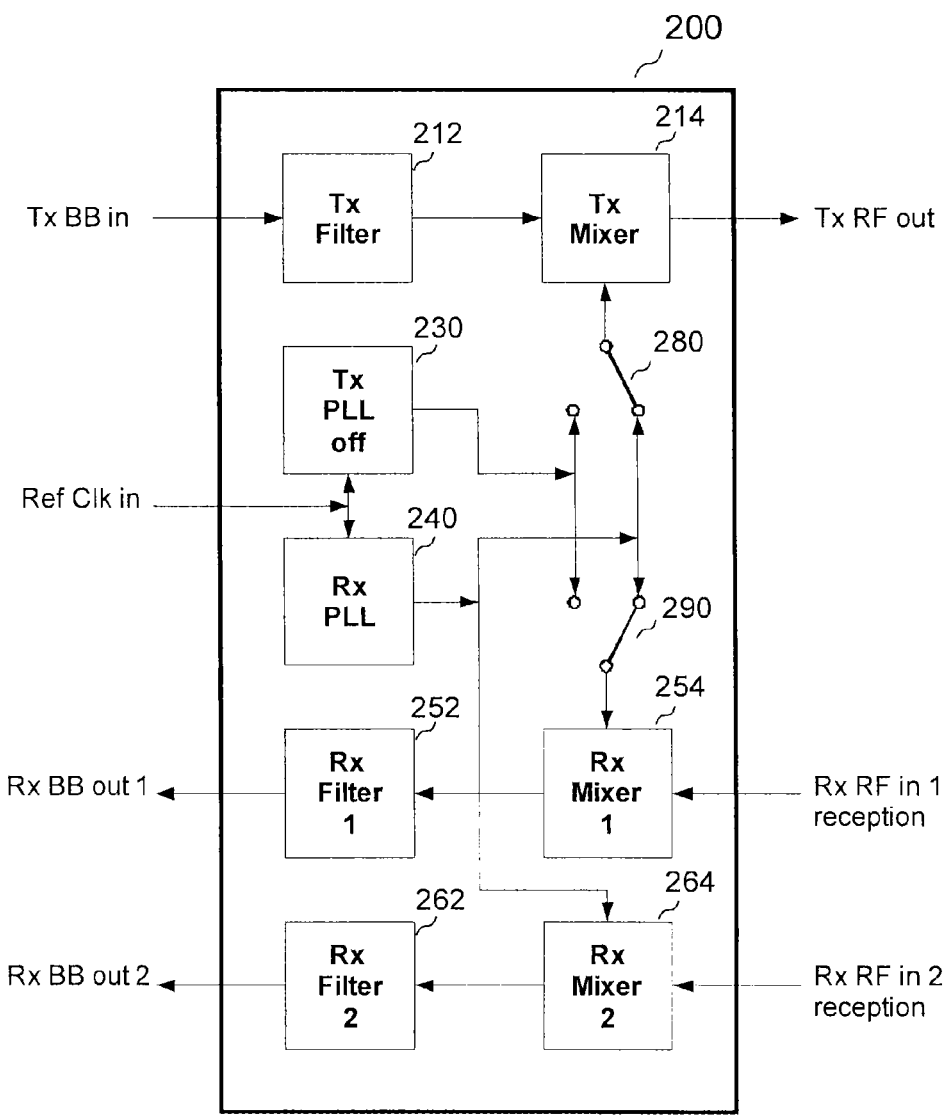
FIG. 5 shows the RF transceiver of FIG. 2 in a third alternative operation mode.

FIGS. 4 and 5 illustrate two operation modes of the RF transceiver of the invention which can be employed in a case where the transceiver is part of a dual mode communication terminal which supports communication in both FDD and TDD (Time Division Duplex) networks. If the communication terminal is currently connected to a TDD network, which means that Rx and Tx operate on the same frequency, this common frequency may be generated by Rx PLL 240, i.e. the Tx mixer switch 280 is connected to Rx PLL 240, as shown in both FIGS. 4 and 5.

Now, Tx PLL 230 is free which allows the following two options:

According to a first option, the first Rx mixer 254 can be switched to Tx PLL 230, as shown in FIG. 4. Tx PLL 230 will then be configured to tune to a different Rx frequency, which allows to perform RSSI measurements, as described above with reference to FIG. 3. This option allows to speed up RSSI measurements for mobile communication at very little implementation cost.

According to a second option, Tx PLL 230 can be switched off to save power, as shown in FIG. 5.

In another embodiment of the invention, not illustrated in the figures, a third switch can be connected between Rx PLL 240 and the second Rx mixer 264 in a similar manner the second switch is connected between Rx PLL 240 and the first Rx mixer 254, to further increase flexibility.

Returning to FIG. 2, the control path for controlling switches 280 and 290 is shown in dashed lines. In FIGS. 3-5 these control paths have been omitted for sake of clarity. Control signals for switches 280 and 290 can be provided by a baseband controller of a baseband unit which together with RF transceiver 200 forms part of a modem in a wireless communication device.

Figure 7:
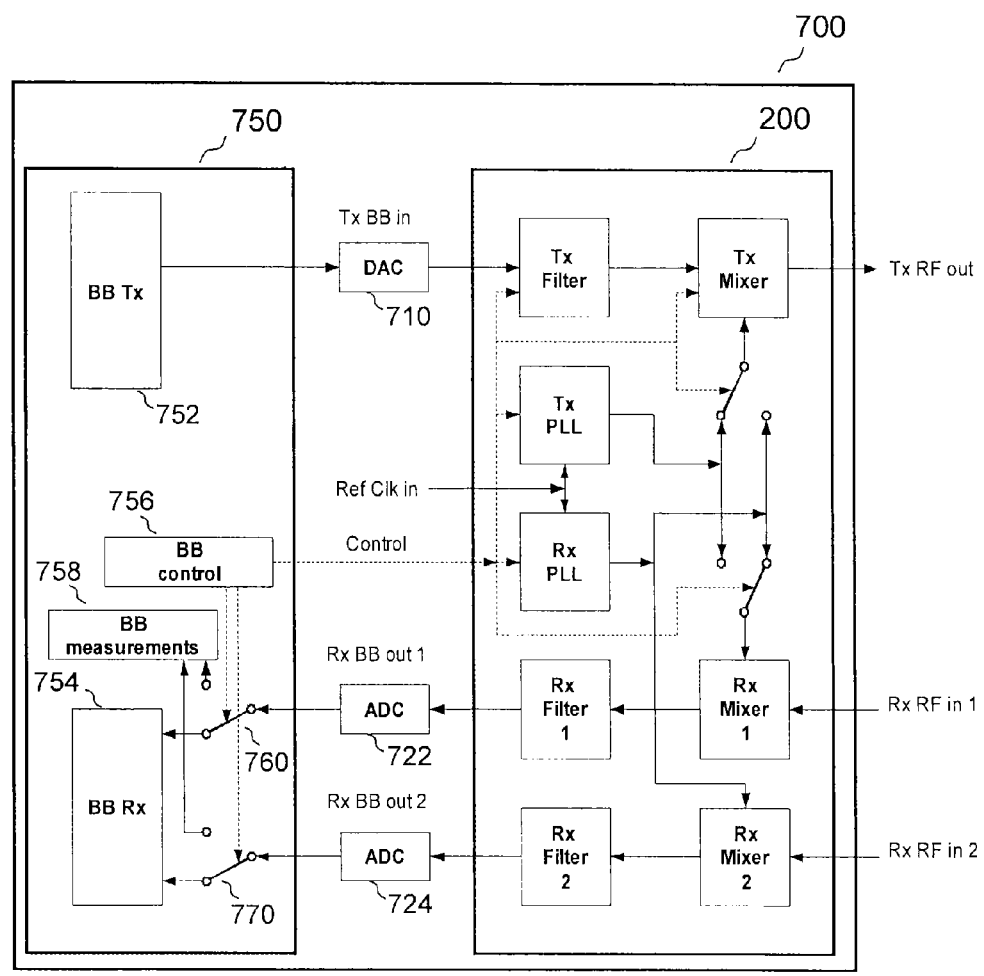
FIG. 7 shows a schematic block diagram of an exemplary embodiment of a modem according to the invention which comprises the RF transceiver of FIG. 2.

FIG. 7 shows a modem 700 as comprising RF transceiver 200 of FIG. 2 and a digital baseband unit 750 which are coupled by analog-to-digital (ADC) and digital-to-analog (DAC) converters, respectively.

An RF transceiver such as shown in FIG. 2 can be implemented on one semiconductor chip, and a baseband (BB) unit such as baseband unit 750 of FIG. 7 can be implemented on another semiconductor chip. DAC 710 and ADCs 722, 724 may reside on the RF or on the BB chip. It is even possible to integrate all components on a single chip.

Switching of switches 280, 290 in RF transceiver 200 is initiated by baseband controller 756 in baseband unit 750 of the modem.

Base band output interface generally is a serial interface; so merely one additional address per switch will be required to control the switches of the inventive RF transceiver.

Besides baseband controller 756, a baseband transmitter 752 and a baseband receiver 754, the base band unit can comprise a baseband measurement unit such as unit 758 illustrated in FIG. 7 for providing a received signal strength indication (RSSI) of a received signal at a frequency other than the current operation frequency of the communication device.

Further the base band unit can comprise switches 760, 770 which selectively connect each of Rx BB inputs of baseband unit 750 to baseband receiver 754 or alternatively to baseband measurement unit 758. FIG. 7 shows switches 760, 770 in a position to support the ordinary LTE communication mode, i.e. reception through two receive paths and transmission through one transmit path. However, BB controller 756 is operable to control switches 760, 770 in a way to support a desired operation mode of RF transceiver 200 such as described above in conjunction with FIGS. 3 to 5.

Figure 6:
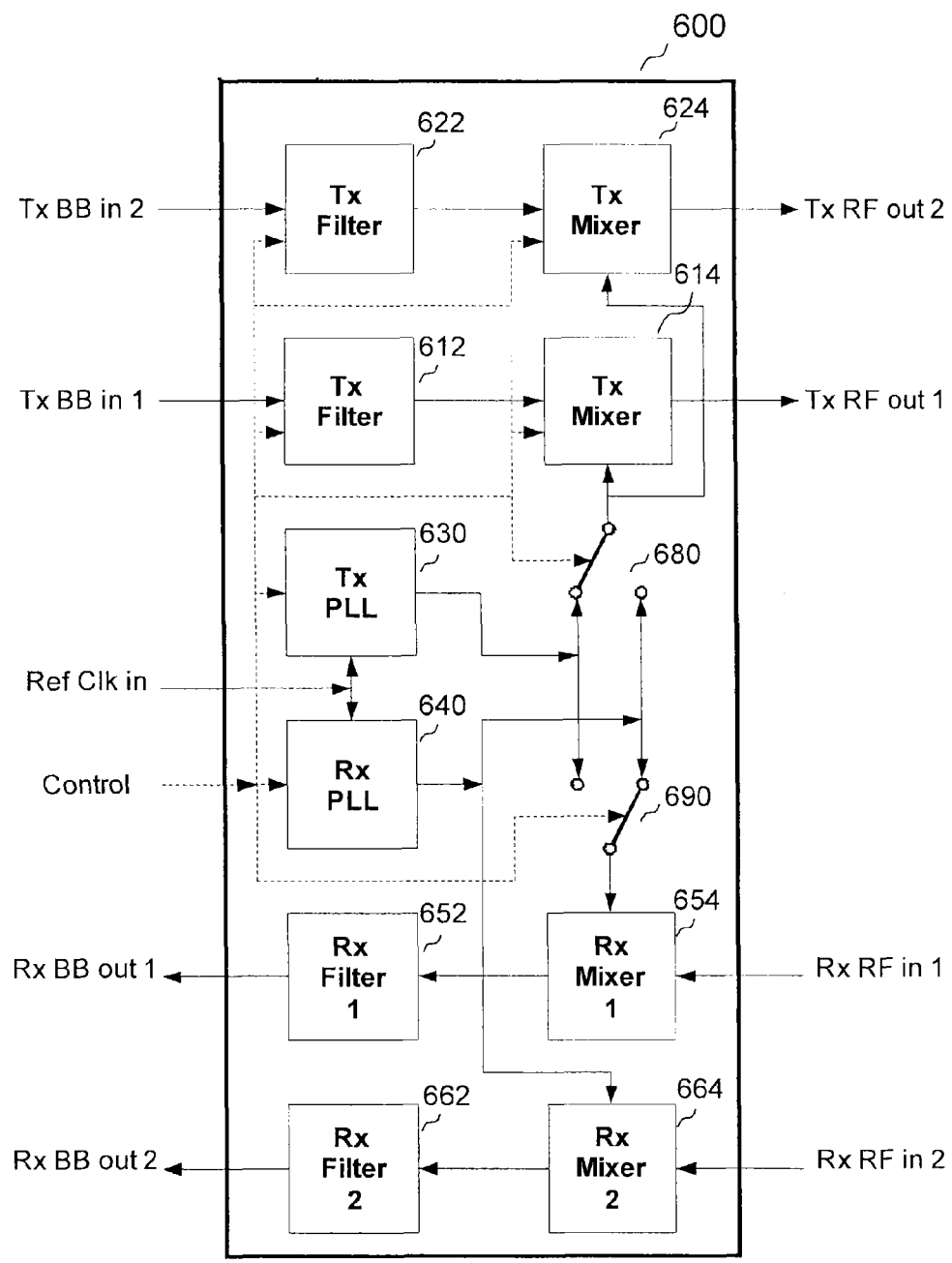
FIG. 6 shows a schematic block diagram of another embodiment of an RF transceiver according to the invention including two transmit paths.

For certain modem applications, in particular those which are not battery powered, it may be advantageous to add another transmit path. Application examples for such embodiments are so called femtocells, i.e. tiny base stations, and so called residential units, i.e. stationary wireless terminals. The block diagram of an embodiment of an RF transceiver incorporating a second Tx path is given in FIG. 6.

For a terminal, the primary application for the second Tx path is to increase the uplink range, which can be achieved in two ways:

In a first operation mode, both Tx paths are used in parallel to increase output power. Also, transmit diversity or beamforming (as described in another patent application of the present applicant, EP 09 179 085.7) can further increase the range.

In another operation mode, only a single Tx path is used at a time, but the best one is selected under base station control, in other words, an Tx antenna selection controlled by the base station is implemented to enhance communication performance.

There have been disclosed an RF transceiver and a modem including a flexible PLL configuration which allows the RF transceiver to support more functionality at very little implementation overhead by enabling use of the transceiver PLLs for other purposes than ordinary LTE traffic communication. Other combinations of the embodiments and operation modes described above readily will suggest themselves to a person skilled in the art in view of the foregoing description.

The invention claimed is:

1. An RF transceiver for an LTE compliant communication device, comprising a transmit side with a transmit PLL synthesizer, and a receive side with a receive PLL synthesizer, said transmit side further comprising at least one transmit path including a transmit mixer unit and a filter unit, and said receive side further comprising at least two receive paths, each path including a respective receive mixer unit and filter unit, said transmit PLL synthesizer being connected to the transmit mixer unit and operable to provide a carrier frequency for said at least one transmit path, and said receive PLL synthesizer being connectable to the receive mixer unit and operable to provide a carrier frequency for said at least two receive paths, wherein:

the transmit PLL synthesizer is connectable to the transmit mixer unit via a switching arrangement, the receive PLL synthesizer is connectable to at least one of the receive mixer units via the same switching arrangement, and said switching arrangement being operable to selectively connect said transmit PLL synthesizer to said at least one receive mixer unit and to selectively connect said receive PLL synthesizer to said transmit mixer unit, said switching arrangement further being operable to connect said receive PLL synthesizer to a first receive mixer unit of a first receive path of the at least two receive paths and to simultaneously connect the transmit PLL synthesizer to a second receive mixer unit of a second receive path of the at least two receive paths.

2. The RF transceiver of claim 1, wherein:

the transmit PLL synthesizer is connectable to the transmit mixer unit via a first pole of a first two-pole switch;

the receive PLL synthesizer is connectable to one of said receive mixer units via a second pole of a second two-pole switch;

first poles of the first and second two-pole switches being interconnected and second poles of the first and second two-pole switches being interconnected;

whereby the first switch is operable to selectively connect the receive PLL synthesizer to said transmit mixer unit and the second switch is operable to selectively connect the transmit PLL synthesizer to said one of receive mixer units.

3. The RF transceiver device of claim 2, wherein the receive PLL synthesizer is connectable to the other one of said receive mixer units via a third switch, with a first pole of the third switch connected to the first pole of the first and second two-pole switches and a second pole of the third switch connected to the second pole of the first and second two-pole switches.

4. A modem for an LTE compliant communication device, comprising a baseband unit which includes a baseband transmitter, a baseband receiver, a baseband controller, and further comprising an RF transceiver according to claim 1, wherein said switching arrangement of the transceiver unit is controlled by said baseband controller.

5. The modem of claim 4, further comprising a received signal strength indication (RSSI) measurement unit, wherein each of the first and second receive paths of the transceiver is, via a respective analog-to-digital converter, connectable to a first and second switch of said baseband unit, each switch being selectively connectable to said baseband receiver or to said baseband RSSI unit adapted to perform received signal strength measurements, wherein the switches of said baseband unit and the switching arrangement of said transceiver unit are controlled by said baseband controller.

* * * * *